Figure 9:
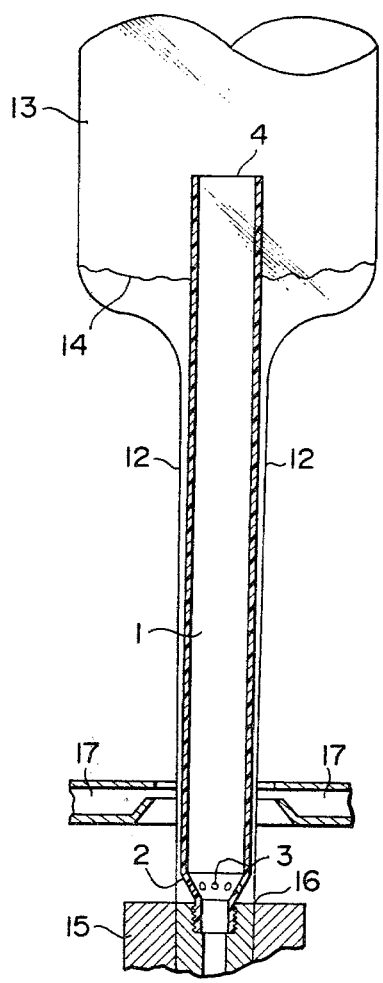

United States Patent [19]

Imaizumi et al.

[11] 4,251,199
[45] Feb. 17, 1981

[54] STABILIZER FOR RESIN BUBBLES

[75] Inventors: Fumio Imaizumi, Ichikawashi; Kazuo Minato; Toshitaka Kanai, both of Chibaken, all of Japan

[73] Assignee: Idemitsu Petrochemical Co. Ltd., Tokyo, Japan

[21] Appl. No.: 45,914

[22] Filed: Jun. 6, 1979

[30] Foreign Application Priority Data

Oct. 31, 1978 [JP] Japan .................. 53/133275

[51] Int. Cl.³ ............................................. B29D 7/22
[52] U.S. Cl. ................................. 425/72 R; 264/565; 425/326.1
[58] Field of Search .................. 425/72 R, 326.1; 264/560, 565, 564, 209

[56] References Cited

U.S. PATENT DOCUMENTS

| 3,544,667 | 12/1970 | Ebert et al. | 425/72 R |
| 3,976,411 | 8/1976 | Rahlfs et al. | 425/326.1 |

FOREIGN PATENT DOCUMENTS 52-19762 2/1977 Japan .
52-77973 6/1977 Japan .
52-108463 9/1977 Japan .

*Primary Examiner*—Jeffery R. Thurlow
*Attorney, Agent, or Firm*—Fred Philpitt

[57] ABSTRACT

A cylindrical stabilizing means (stabilizer) for resin bubbles useful to perform shaping of tubular films without causing the fluctuation or breakage of resin bubbles even in case where a take up velocity of the tubular film is relatively large, cooling of tubular body of molten resin extrudated from a die is not sufficient or amount of extrudate from a die is relatively large, is provided. Said stabilizing means has penetration holes on the circumferential wall close to the annular slit 16 of die, which communicate with an opening of the tip of the means, and also has continuous deep grooves of a depth of 0.5 mm or more extending from the portion of the circumferential wall close to said annular slit to the opening of the tip, which grooves are formed on the whole outer circumferential wall having fine concave and convex engraved patterns of the difference of height or depth of from 0.1 mm to 0.5 mm.

5 Claims, 9 Drawing Figures

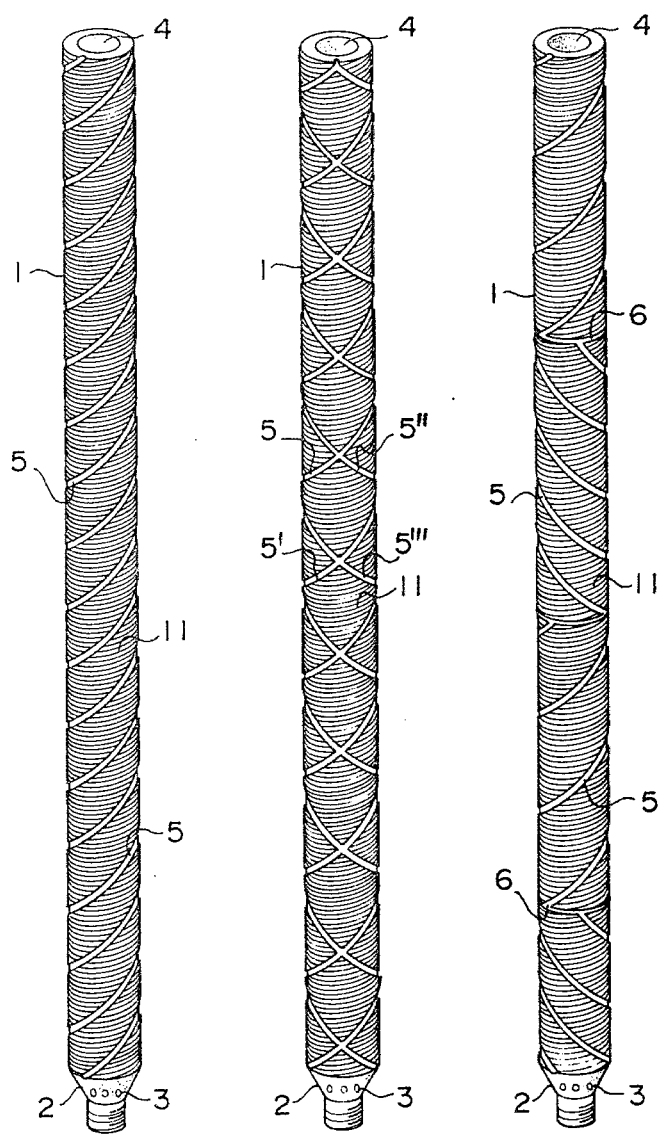

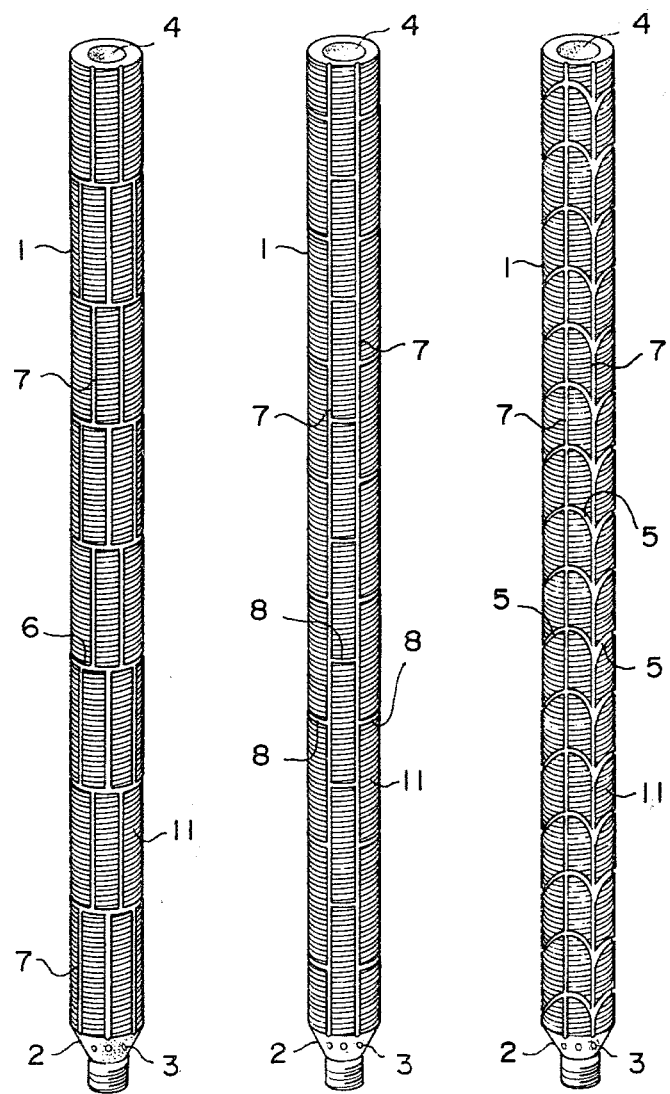

FIG. 7
FIG. 8
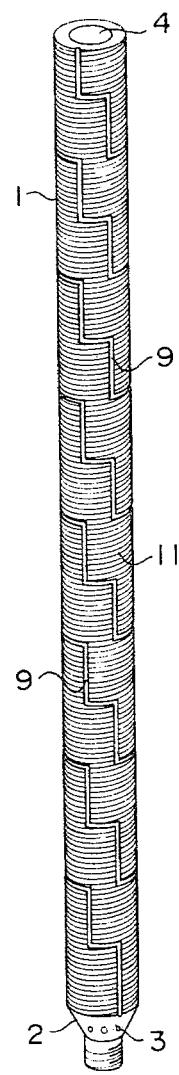
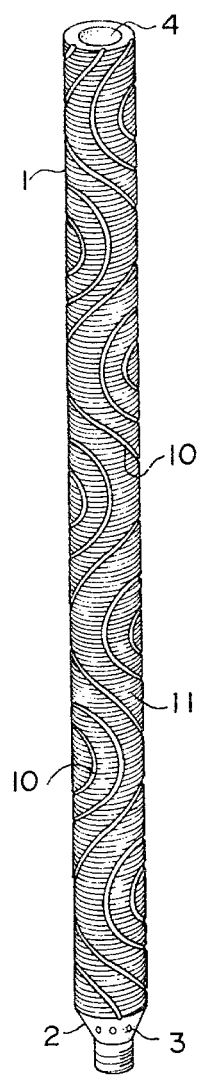

STABILIZER FOR RESIN BUBBLES

DESCRIPTION OF THE INVENTION

This invention relates to surface structures of a cylindrical stabilizing means which will be hereinafter referred to as a stabilizer for resin bubbles, to be fixed to a shaping die to prevent the resin bubbles from fluctuating or shaking at the time of shaping a tubular film according to an air-cooling inflation process.

It has heretofore been known that a method for shaping tubular films according to an air-cooling inflation process by extruding molten olefin polymer synthetic resin such as polyethylene or the like in a tubular form from a shaping die, taking it up while cooling with air and holding a diameter almost the same with that of an annular form slit, and inflating it to a diameter greater than that of the annular form slit to provide a funnel-shaped resin bubble, provides products having good balance of longitudinal and transversal mechanical properties and superior impact strength. However, this shaping process has a drawback that if a tubular film is shaped in a high inflation ratio, a resin bubble fluctuates, making its cooling non-uniform, and on this account, deviation of thickness, wrinkles and slacking are formed in the resulting tubular film and the diameter i.e. width of folded tubular film becomes also non-uniform.

As a method for solving such a drawback, there has been known a process in which the fluctuation of a resin bubble is prevented by fixing a cylindrical material having an outside diameter almost the same with the diameter of the annular-form slit of a die and causing a tubular body of molten resin extruded from a die before starting of inflation to go along the outer circumferential surface of the side wall of this cylindrical material. Further it has been also known that if fine convex and concave patterns or continuous grooves of spiral form are provided on the outer circumferential surface of the side wall of this cylindrical material, the fluctuation of resin bubbles can be prevented more effectively. However, there has been a drawback for these conventional cylindrical stabilizers for resin bubbles in that with an increase of take-up speed of tubular films or if the cooling of tubular body of molten resin extruded from a die is insufficient or the amount of extruded resin from a die becomes greater, the fluctuation or breakage of resin bubbles is brought about and the shaping of tubular films become infeasible.

In order to solve these problems, we have made an extensive study about stabilizers for resin bubbles. As a result, we have found that if fine convex and concave patterns and continuous grooves of spiral form are formed on the outer circumferential surface of the side wall of cylindrical stabilizers for resin bubbles, the fluctuation and breakage of resin bubbles can be prevented even in case where the take-up of tubular films is carried out at an extremely high speed and also even in case where the cooling of tubular body of molten resin extruded from a die before inflation is insufficient or the amount of molten resin extruded is so high that the frost line of resin bubble becomes higher, and thus the present invention has been completed.

Thus according to the present invention, a stabilizer for cylindrical resin bubbles, having a diameter almost the same with that of annular-form slit of a die, which is used by fixing to a shaping die for air-cooling inflation process, has on the circumferential wall herein referred to includes not only a cylindrical portion but also frustoconical portion of base part near the annular-form slit, penetration holes communicating with the opening of the tip, and is provided with engraved continuous deep grooves having, from the circumferential wall near the annular-form slit to the opening of the tip, a depth of 0.5 mm or more, on the whole outer circumferential wall containing fine concave and convex patterns having the difference of height of from 0.1 to 0.5 mm.

The present invention will be described more concretely referring to accompanying drawings in which FIGS. 1 to 8 are perspective views each showing one embodiment of a stabilizer for resin bubbles of the present invention, respectively and FIG. 9 is a cross-sectional view which shows schematically how to use a stabilizer for resin bubbles, of the present invention.

The stabilizer for resin bubbles of the present invention, shown in the drawing comprises a base part 2 having an outside diameter smaller than the diameter of annular-form slit 16 of a die 15 and a cylinder part 1 having an outside diameter almost the same with the diameter of the annular-form slit 16 of the die. The cylinder part 1 has an opening 4 at its tip and the peripheral wall of the base part 2 has one or more penetration holes 3. These penetration holes 3 are communicated with the opening 4 of the tip of the cylinder part 1 and can be provided by boring the circumferential wall of the cylinder part 1 very close to the base part 2. As for their number, it is common to provide from 3 to 8 of them.

On the outer circumferential surface of the cylinder part 1 of the stabilizer for resin bubbles, of the present invention, there are formed by engraving in uniformly distributed arrangement, fine convex and concave patterns 11 having a difference of height or depth of from 0.1 to 0.5 mm. Further from the end of the side of the base part 2 to the opening 4 of the tip, there are provided by engraving, in uniformly dispersed arrangement, continuous deep grooves having a depth of 0.5 mm or more on the outer circumferential surface of the cylinder part 1. These continuous deep grooves are provided by suitably engraving one or more stripes each consisting of one kind of spiral form, broken line form or wave form grooves or by engraving a plurality of stripes consisting of a combination of various kinds of above-mentioned forms of grooves or by engraving a combination of the above-mentioned forms of grooves with grooves of other forms such as circular ring form, elliptical ring form, quasiring form, or linear form.

A stabilizer for resin bubbles is shown in FIG. 1 which stabilizer is constructed by engraving a plurality of grooves of spiral form 5 having a same lead angle or inclination on the outer circumferential surface of the cylinder part 1, as continuous deep grooves, at a same mutual interval between each other. FIG. 2 shows a case where a plurality of spiral form grooves 5, 5' and 5'', 5''' having a different lead angle and mutual crossing are constructed on the outer circumferential surface of the cylinder part 1 to make the continuous deep grooves into a reticular form. It is common to set the lead angle of such screw form grooves 5, in the range of from 5° to 85°. FIG. 3 shows one example of a stabilizer for resin bubbles constructed by combining spiral-form grooves 5 and ring-form grooves 6 as continuous deep grooves. FIG. 4 shows one example of a stabilizer for resin bubbles constructed by combining ring-form grooves 6 and linear form longitudinal grooves 7 to form a reticular engraved shape as continuous grooves. As shown in FIGS. 3 and 4, when ring-form grooves 6 are provided by way of engraving while forming spaces in the longitudinal direction of the outer circumferential surface of the cylinder part 1 of a stabilizer for resin bubbles, it is necessary to make the whole deep grooves continuous from the end of the side of the base part 2 to the opening 4 of the tip on the outer circumferential surface of the cylinder part 1 of the stabilizer for resin bubbles, by providing by way of engraving, spiral-form grooves 5 or linear-form longitudinal grooves 7 between mutually neighbouring ring-form grooves 6. In FIGS. 5 and 6, there are shown stabilizers for resin bubbles having reticular continuous deep grooves which are provided by way of engraving a plurality of longitudinal grooves 7 and transversal form 8 or spiral 5 form grooves formed between the said longitudinal grooves, on the outer peripheral surface of the cylinder part 1. In FIGS. 7 and 8 there are shown a case in which grooves of broken lines 9 are formed by way of engraving and a case in which grooves of wave form grooves 10 are formed by way of engraving. In all these cases, it is common to select depth of continuous deep grooves in the range of 0.5 mm or more, preferably from about 1 mm to 2 mm and width in the range from the same value with the depth to about 4 times thereof and the shape of cross-sectional area of V shape or U shape. It is also possible to perforate penetration holes 3 communicating with the opening 4 of the tip of the cylinder part 1, in the inside of these continuous deep grooves. On the one hand, in the remaining portion of the outer circumferential surface of the cylinder part 1 of the stabilizer for resin bubbles provided with the above-mentioned continuous engraved deep grooves, fine convex and concave patterns 11 are formed. These fine convex and concave patterns 11 can be formed by providing small concave portions minutely, but the preparation thereof is very simple if small spiral form grooves having a short pitch are engraved on the circumferential surface of the cylinder part 1. Particularly, small spiral form grooves having a short pitch will be conveniently formed by engraving one or two stripes of grooves having a depth of 0.1 to 0.5 mm with a lead angle of about 5° or less, at same intervals.

The stabilizers for resin bubbles as described in FIG. 9, of the present invention are used by fitting their base parts 2 to shaping dies for air-cooling inflation process coaxially with an annular slit 16. A tubular body 12 of molten resin extruded from a die 15 is taken up along the cylinder part 1 of the stabilizer for resin bubble while being cooled with air spouting from an air-cooling ring 17 and a funnel form resin bubble 13 is formed by starting inflation suddenly. At this time, the tubular body 12 of molten resin does not stick to the base part 2 of the stabilizer for resin bubbles because the base part 2 is made to be smaller than the diameter of the annular slit 16. Further between the tubular body 12 of molten resin and the penetrating holes 3 perforated on the base part 2 of the stabilizer for resin bubbles or the circumferential wall very close to the base part 2 of the cylinder part 1, an effect of absorbing the air in the inside of the cylinder part 1 is created and the tubular body 12 of molten resin ascends along the cylinder part 1 of the stabilizer for resin bubbles without sticking to the surface thereof in all parts by being guided by the stream of these absorbed pressurized air. It goes without saying that the stabilizer for resin bubbles of the present invention has a length sufficiently longer than the part of the tubular body 12 of molten resin extruded from the die 15 before the starting of inflation. After cooled sufficiently with air, the resin bubble 13 is pressed into a folded flat tubular film by being clamped with a pinch roll (not shown) and wound up. It is not preferable to make the depth of the continuous deep grooves on the outer circumferential surface of the cylinder part of the stabilizer for resin bubble, smaller than 0.5 mm because of liability of breakage of the resin bubble at the time of high speed taking up of the tubular film. Further it is not preferable to make the difference of height or depth of the fine convex and concave patterns, smaller than 0.1 mm because of liability of fluctuation of resin bubbles under the shaping condition of higher frost line. Further it is not preferable to make the above-mentioned difference of height or depth greater than 0.5 mm because numberless flaws are formed by contacting with these convex and concave patterns in addition to the tendency of upward and downward fluctuation of resin bubbles probably caused by the reduction of contact resistance formed in the part before the starting of inflation of the tubular body of molten resin.

The present invention will be described more concretely by referring to specific examples and comparative examples.

EXAMPLE 1

By using a shaping die 15 for air-cooling inflation process in which a cylindrical stabilizer for resin bubbles is mounted coaxially with an annular slit 16 as shown in FIG. 9, a high density polyethylene (produced by Idemitsu Petrochemical Company Limited: Idemitsu polyethylene 640 UF) was melted and extruded from this die 15 at a die-setting temperature of 200° C., extrusion rate of molten resin of 16.3 kg/hr. to shape a funnel shaped resin bubble 13 at an inflation ratio of 3.5 and a take-up velocity of tubular film of 100 m/min. while the flow amount of cooling air from an air-cooling ring 17 was controlled to keep the height of frost line 14 formed on the resin bubble 13 from the upper surface of the die 15, at 300 mm and thus shaping of a tubular film was carried out.

As a shaping die 15 for air-cooling inflation process, the one having an inside diameter of annular slit 16 of 30 mm and a clearance of annular slit 16 of 1.0 mm was used. As shown in FIG. 1 the stabilizer for resin bubbles was made of aluminum and had, when mounted on the top of the die 15, a height from the upper surface of the die 15, of 500 mm; an outside diameter of the portion of the base part 2 contacting with the die 15, of 15 mm; an outside diameter of the cylinder part 1, of 30 mm, a height of the cylinder part 1 of 480 mm; an opening 4 on the tip of the cylinder part 1; 8 penetration holes 3 having a diameter of 2.0 mm, bored in the base part 1, one stripe of spiral-form groove having a V-form cross-section, a pitch of 0.65 mm, a depth of 0.2 mm and a width of 0.3 mm and 3 stripes of spiral form grooves 5 having a lead angle of 45°; a depth of 1.5 mm, a width of 3.5 mm, U-form cross section and at same intervals between the stripes both engraved on the outer circumferential surface of the cylinder part 1.

As the result, there was no fluctuation of the resin bubble 13 and the impact strength of resultant tubular film having a thickness of 9 micron, was 4000 kg·cm/cm.

COMPARATIVE EXAMPLE 1

Shaping of a tubular film was carried out under the same conditions with those of example 1 except that the difference of height or depth of fine convex and concave patterns of the stabilizer for resin bubbles was set to 0.025 mm.

As the result, the resin bubble 13 was broken and the shaping of tubular film was not continued for more than 10 minutes.

COMPARATIVE EXAMPLE 2

Shaping of tubular films was carried out under the same shaping conditions as those of example 1 and by using, as a stabilizer for resin bubbles, the one same with that of example 1 except that deep grooves were omitted therefrom. As the result, the resin bubble 13 was broken and tubular films could not be shaped.

EXAMPLE 2

By using, as a stabilizer for resin bubbles, those formed by engraving a first set of two stripes 5 and 5' of equal intervals and a second set of two stripes 5" and 5'" of equal intervals and being symmetrical to the first set in respect to the generating line of the cylinder surface are engraved as shown in FIG. 2, shaping of tubular films was carried out under the same shaping conditions as those of example one in other point. The result was same with that of example 1 and the impact strength of resultant tubular film was 3950 kg·cm/cm.

EXAMPLE 3

By using as a stabilizer for resin bubble the same one with that of example 1 except that two stripes of spiral form grooves 5 having same intervals therebetween, a lead angle of 45°, a depth of 1.2 mm, a width of 2.8 mm and a cross-section of U-form and one stripe of spiral form grooves having a lead angle of 0.4°, a depth of 0.2 mm, a width of 0.6 mm and a cross-section of V-form were formed by engraving, respectively and 4 penetration holes 3 were formed in the base part 2 of the stabilizer, a resin bubble 13 was shaped at an inflation ratio of 4.2 and a take-up speed of the tubular film of 77.6 m/min. and thus a tubular film was shaped under the same shaping conditions with those of example 1 except that the flow amount of cooling air from a cooling ring 17 was controlled to keep the height of a frost line 14 formed on the resin bubble 13 from the upper surface of a die 15 at 440 mm.

As the result, a continuous operation was carried out for a long time without the fluctuation of the resin bubble.

COMPARATIVE EXAMPLE 3

By using the same stabilizer for resin bubble with that of example 3 except that deep grooves were omitted, shaping of a tubular film was carried out as in example 3.

As the result when shaping was carried out while controlling the flow amount of cooling air from a cooling ring 17 to keep the height of the frost line 14 of the resin bubble 13 at 330 mm from the upper surface of a die 15, normal shaping could not be carried out because of up and down fluctuation of the resin bubble 13. Namely, this example shows that such an extent of cooling as that of example 3 is insufficient and on the contrary, example 3 shows that sufficient shaping could be carried out even in case where the amount of colling air looked to be insufficient.

COMPARATIVE EXAMPLE 4

By using a stabilizer for resin bubbles the same with that of example 3 except that the fineness of convex and concave patterns thereof were made extremely smaller and the difference of height was set to 0.025 mm, the shaping of a tubular film was carried out as in example 3.

As the result when shaping was carried out while controlling the flow amount of cooling air from an air-cooling ring 17 to keep the height of the frost line 14 of the resin bubble 13 at 270 mm from the upper surface of the die 15, normal operation could not be carried out due to the up-and-down shaking of the resin bubble 13. Namely, this example also shows that the extent of cooling as in example 3 is insufficient.

What is claimed is:

1. In an apparatus for producing tubular synthetic resin film by an air-cooling inflation process, said apparatus including a die having an annular slit through which the resin is extruded and an elongated stabilizer member extending upwardly from said die along a path which is coaxial with said die, said stabilizer having a diameter that is approximately the same as said annular die, and an opening in the end which is farthest from said annular die, the improvement which comprises:
   (a) the portion of said stabilizer that is closest to said die having a reduced diameter portion in comparison to the diameter of the remaining portion of the stabilizer,
   (b) a plurality of penetration holes extending through the wall of said stabilizer in said reduced diameter portion,
   (c) the entire outer circumferential wall surface of the stabilizer that extends above said reduced diameter portion being provided with
      (1) an engraved pattern of spaced apart deep grooves having a depth of 0.5 mm or more, said pattern forming a plurality of deep channels that extend from said reduced diameter portion to said opening in the end of the stabilizer that is farthest from said annular die, and
      (2) an engraved pattern of shallow grooves having a depth of from 0.1 to 0.5 mm, said shallow grooves interconnecting said spaced apart pattern of deep grooves.

2. An apparatus according to claim 1 wherein said deep grooves are in spiral form.

3. An apparatus according to claim 1 wherein said deep grooves comprise a network of intersecting spirals.

4. An apparatus according to claim 2 wherein said spirals are discontinuous.

5. An apparatus according to any one of claims 1–4 wherein said shallow grooves are each arcs of circles that are perpendicular to the axis of the stabilizer.

* * * * *